United States Patent
Komagata et al.

(10) Patent No.: US 8,085,784 B2
(45) Date of Patent: Dec. 27, 2011

(54) DATA TRANSMITTING APPARATUS AND DATA TRANSMITTING METHOD

(75) Inventors: Junichi Komagata, Tokyo (JP); Tomokazu Suda, Kanagawa (JP)

(73) Assignee: Sony Corporation, Tokyo (JP)

( * ) Notice: Subject to any disclaimer, the term of this patent is extended or adjusted under 35 U.S.C. 154(b) by 997 days.

(21) Appl. No.: 10/751,530

(22) Filed: Jan. 6, 2004

(65) Prior Publication Data

US 2004/0141512 A1    Jul. 22, 2004

(30) Foreign Application Priority Data

Jan. 21, 2003   (JP) ................ P2003-012507

(51) Int. Cl.
   *H04L 12/56*   (2006.01)
(52) U.S. Cl. .............. 370/395.4; 370/395.42; 370/412
(58) Field of Classification Search ............... None
   See application file for complete search history.

(56) References Cited

U.S. PATENT DOCUMENTS

| | | | | |
|---|---|---|---|---|
| 5,539,729 A * | 7/1996 | Bodnar | ............... | 370/232 |
| 5,625,626 A * | 4/1997 | Umekita | ............... | 370/448 |
| 6,122,280 A * | 9/2000 | Hamai et al. | ........... | 370/389 |
| 6,560,230 B1 * | 5/2003 | Li et al. | ................ | 370/395.42 |
| 6,570,849 B1 * | 5/2003 | Skemer et al. | ......... | 370/230.1 |
| 7,039,063 B2 * | 5/2006 | Krishnakumar et al. | ..... | 370/444 |
| 2002/0031086 A1 * | 3/2002 | Welin | ............... | 370/229 |
| 2003/0119556 A1 * | 6/2003 | Khan et al. | ........... | 455/560 |
| 2003/0189943 A1 * | 10/2003 | Gorti et al. | ........... | 370/412 |
| 2004/0004971 A1 * | 1/2004 | Wang | ............... | 370/412 |
| 2004/0037294 A1 * | 2/2004 | Yamaguchi et al. | ..... | 370/395.42 |
| 2004/0114516 A1 * | 6/2004 | Iwata et al. | ........... | 370/230.1 |
| 2004/0160971 A1 * | 8/2004 | Krause et al. | ......... | 370/412 |

FOREIGN PATENT DOCUMENTS

| | | |
|---|---|---|
| JP | 09-186706 | 7/1997 |
| JP | 2001-086499 | 3/2001 |
| JP | 2002-16637 | 1/2002 |
| JP | 2002-314595 | 10/2002 |
| JP | 2003-018208 | 1/2003 |

OTHER PUBLICATIONS

CA 2410773 A1 (Canadian Patent Application Publication), Yoshiaki Shiota, Packet Scheduling Apparatus, Nov. 28, 2002, pp. 4, 12, and 14.*
JP Official Action dated Aug. 23, 2005.

* cited by examiner

*Primary Examiner* — Anthony Sol
(74) *Attorney, Agent, or Firm* — Rader, Fishman & Grauer PLLC

(57) ABSTRACT

With time intervals and transmission times of packets of real time streams, transmission end times thereof are calculated. The transmission order of packets of the real time streams is decided in the order of the earlier transmission end times thereof. Transmission end times of packets of a non-real time stream are compared with the scheduling times of packets of the plurality of real time streams. When the transmission end times of packets of the non-real time stream are earlier than any one of the scheduling times of packets of the plurality of real time streams, the packets of the non-real time streams are transmitted.

16 Claims, 13 Drawing Sheets

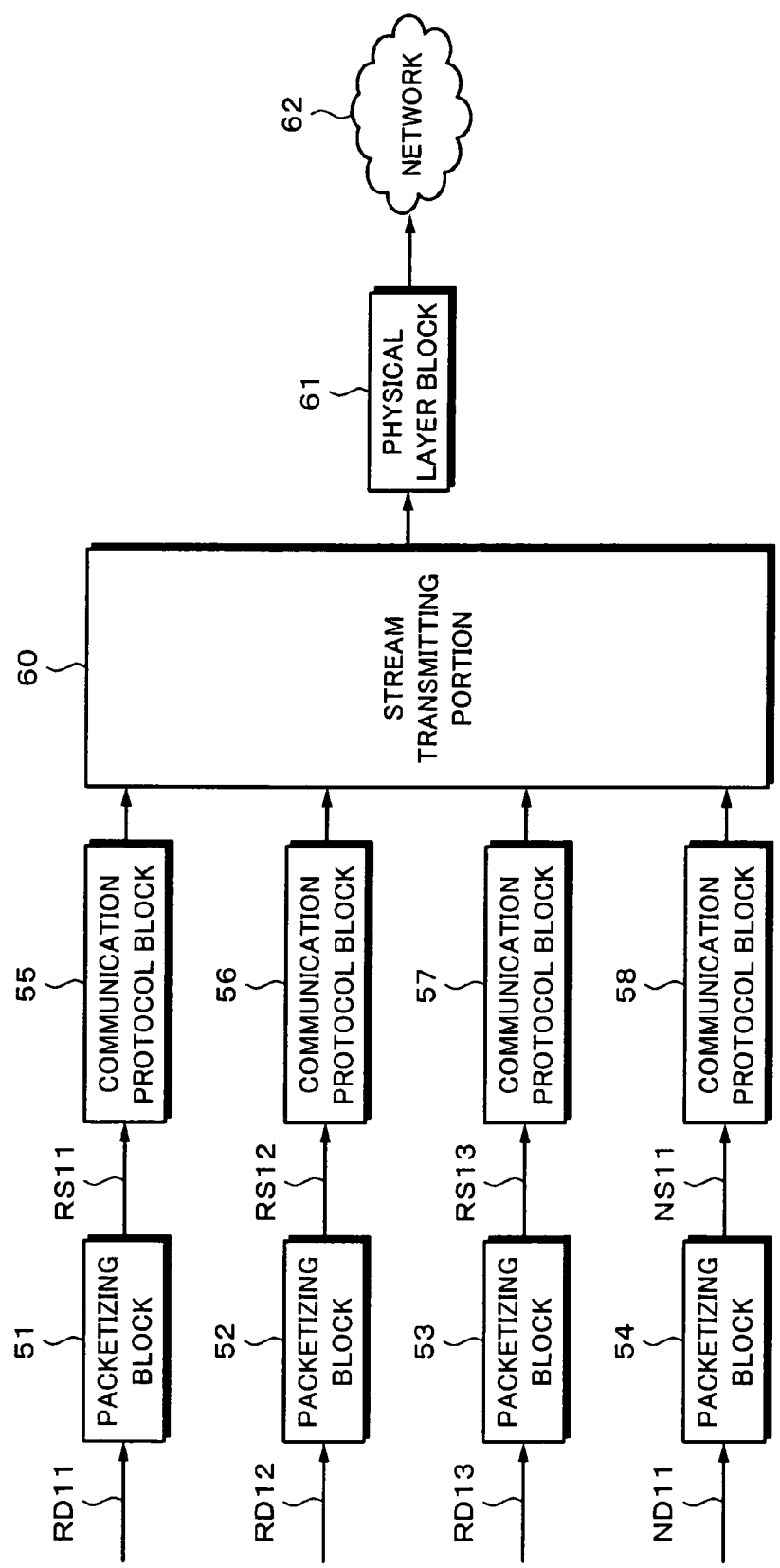

DATA TRANSMITTING APPARATUS AND DATA TRANSMITTING METHOD

CROSS REFERENCE TO RELATED APPLICATION

The present document contains subject matter related to Japanese Patent Application JP 2003-012507 filed in the Japanese Patent Office on Jan. 21, 2003, the entire contents of which being incorporated herein by reference.

BACKGROUND OF THE INVENTION

1. Field of the Invention

The present invention relates to a data transmitting apparatus and a data transmitting method for transmitting a plurality of real time streams and a non-real time stream over one transmission path.

2. Description of the Related Art

When a plurality of real time streams are transmitted over one transmission path, the transmission times of packets of the real time streams are kept nearly constant. In other words, a predetermined time interval is set for each stream. Time intervals of individual streams are measured. After the time interval of each stream has elapsed, packets thereof are transmitted. When packets of each stream are transmitted at the predetermined time intervals, the time intervals of packets of each stream become nearly constant. Thus, a predetermined transmission rate can be kept constant.

While packets of one stream are being transmitted over one transmission path, packets of another stream cannot be transmitted thereonto. Thus, when packets of a plurality of streams have to be transmitted over one transmission path, it is necessary to mediate them. Only packets of a stream that has been mediated are permitted to be transmitted. Packets of the other streams are placed on standby.

Thus, as described above, to keep the transmission rate of each stream constant, the transmission times of packets of each real time stream are kept nearly constant. However, actually, the transmission times of packets of each stream delay (namely, jitters take place). Such jitters cause a screen to distort when image data in accordance with the Moving Picture Coding Experts Group (MPEG) or the MPEG2 is transmitted.

When packets of a plurality of streams are transmitted at a time, the round robin method is used to mediate them.

FIG. 1 shows a structure of a conventional stream transmitting apparatus that transmits a plurality of real time streams and a non-real time stream over one transmission path.

In FIG. 1, buffer memories 101, 102, 103, and 104 are First-In First-Out (FIFO) memories. Packets of the streams are successively stored in the buffer memories 101, 102, 103, and 104. When packets of the streams have been stored in the buffer memories 101, 102, 103, and 104, they send transmission requests to a round robin portion 105. When the transmission times of packets transmitted from the buffer memories 101, 102, 103, and 104 overlap, the round robin portion 105 mediates the transmission requests.

FIG. 2 shows a mediating method performed by the round robin portion 105. In FIG. 2, the round robin process is reset (at step S101). A packet that has been stored first in a buffer memory is transmitted.

Thereafter, it is determined whether or not there is a packet in the buffer memory (at step S103). When there is another packet in the buffer memory, the buffer memory that has transmitted a packet is prohibited from transmitting another packet. A buffer memory that has not transmitted a packet is given a transmission right (at step S104). Thereafter, it is determined whether or not all the buffer memories have transmitted packets (at step S105). Until all the buffer memories have transmitted packets, steps S103 to S105 are repeated.

When a real time stream and a non-real time stream such as MPEG streams are transmitted over one transmission path, as a related art reference that prevents packets from colliding, Japanese Patent Laid Open Publication No. 2001-86499 titled "Image Transmitting Apparatus and Image Transmitted Method (translated title)" filed by Victor Company of Japan, Ltd. is known.

RELATED ART REFERENCE

Japanese Patent Laid Open Publication No. 2001-86499

However, when packets of streams are mediated by the round robin portion, transmission rights are equally given to individual streams. Alternatively, streams are weighted and priority levels are assigned thereto so as to mediate them. Thus, if packets of one stream are transmitted while packets of another stream is being transmitted or if the bandwidth of one stream is large while the bandwidth of another stream is small, transmission rights are equally given to the individual streams. As a result, jitters take place.

In addition, there is a situation of which a plurality of real time streams and a non-real time stream are transmitted over one transmission path. Even if packets of the non-real time stream are transmitted with a delay, no critical problem would take place. Thus, when a plurality of real time streams and a non-real time stream are transmitted over one transmission path, it is preferred to transmit packets of real time streams prior to packets of a non-real time stream so as to prevent the non-real time stream from adversely affecting the real time streams. However, when streams are mediated by the round robin portion, transmission rights are equally given to a non-real time stream and real time streams.

OBJECTS AND SUMMARY OF THE INVENTION

Therefore, an object of the present invention is to provide a data transmitting apparatus and a data transmitting method that allow jitters of real time streams to become minimal and a non-real time stream to be effectively transmitted without adversely affecting the transmissions of the real time streams when they are transmitted over one transmission path.

A first aspect of the present invention is a data transmitting apparatus for transmitting a plurality of real time streams and a non-real time stream over a common transmission path, comprising:

storing means for storing first packets that compose the real time streams and second packets that compose the non-real time stream; and transmitting means for transmitting the first packets stored in the storing means at predetermined intervals, transmitting a first packet whose transmission end time is the earliest in the first packets when the transmission times of the first packets overlap, and transmitting the second packets when the transmission intervals of the first packets are longer than the transmission times of the second packets.

A second aspect of the present invention is a data transmitting method for transmitting a plurality of real time streams and a non-real time stream over a common transmission path, comprising the steps of:

storing first packets that compose the real time streams and second packets that compose the non-real time stream; and transmitting the first packets stored at the storing step at predetermined intervals, transmitting a first packet whose transmission end time is the earliest in the first packets when the transmission times of the first packets overlap, and transmitting the second packets when the transmission intervals of the first packets are longer than the transmission times of the second packets.

When a plurality of real time streams and a non-real time stream are transmitted over one transmission path, real time streams are transmitted at predetermined time intervals and the non-real time stream is transmitted so it does not adversely affect the transmissions of the real time streams.

When the transmission times of packets of a plurality of streams overlap, the transmission order of the real time streams are decided so that the jitters of packets of the real time streams become minimal. The non-real time stream is transmitted so that it does not adversely affect the transmissions of the real time streams and the delay times of packets of the non-real time streams become minimal.

In other words, with the time intervals and transmission times of packets of real time streams, the transmission end times thereof are calculated. The transmission order of packets of the real time streams is decided in the order of the earlier transmission end times thereof.

The transmission end times of packets of the non-real time stream are compared with the scheduling times of packets of the plurality of real time streams. When the transmission end times of packets of the non-real time stream are earlier than any one of the scheduling times of packets of the plurality of real time streams, the packets of the non-real time stream are transmitted.

Thus, the jitters of packets of the real time streams can be decreased. In addition, the non-real time stream can be transmitted on best effort basis without adversely affecting the transmissions of the real time streams.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 13 is a block diagram showing a structure of a transmitting apparatus according to another embodiment of the present invention.

DETAILED DESCRIPTION OF THE PREFERRED EMBODIMENTS

Figure 3:
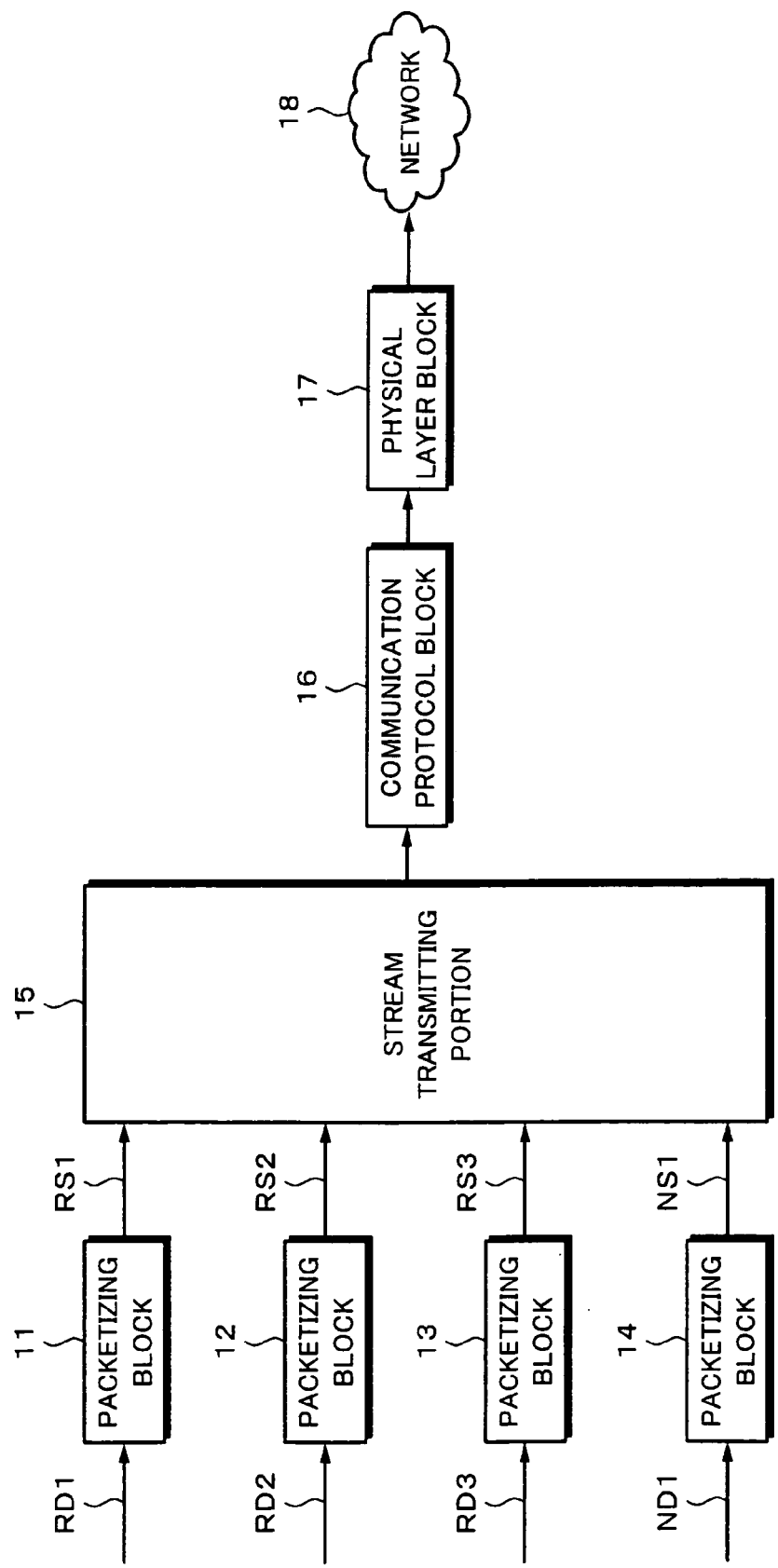
FIG. 3 is a block diagram showing a structure of an example of a transmitting apparatus according to the present invention.

Next, with reference to the accompanying drawings, embodiments of the present invention will be described. FIG. 3 shows an embodiment of the present invention.

In FIG. 3, data RD1 RD-is supplied to a packetizing block 11. Data RD2 is supplied to a packetizing block 12. Data RD3 is supplied to a packetizing block 13. The packetizing blocks 11, 12, and 13 are packetizing blocks that process data of real time streams. The data RD1, RD2, and RD3 are in reality moving picture and audio data of which time information is important.

The packetizing blocks 11, 12, and 13 packetize the data RD1, RD2, and RD3 so that they can be transmitted over a network.

The packetizing block 11 outputs packets of a real time stream RS1 of which the data RD1 has been packetized. The packetizing block 12 outputs packets of a real time stream RS2 of which the data RD2 has been packetized. The packetizing block 13 outputs packets of a real time stream RS3 of which the data RD3 has been packetized. The packetizing blocks 11, 12, and 13 are in reality encoders in accordance with the MPEG or MPEG2. The real time streams RS1, RS2, and RS3 are for example streams in accordance with the MPEG or MPEG2. Of course, the real time streams RS1, RS2, and RS3 are not limited to streams in accordance with the MPEG or MPG2.

Data ND1 is supplied to a packetizing block 14. The packetizing block 14 is a packetizing block that packetizes data of a non-real time stream. The data ND1 is in reality text data of which time information is not important. The packetizing block 14 packetizes the data ND1 so that it can be transmitted over the network. The packetizing block 14 outputs packets of a non-real time stream NS1 of which the data ND1 has been packetized.

The packets of the real time streams RS1, RS2, and RS3 that are output from the packetizing blocks 11, 12, and 13 and the packets of the non-real time stream NS1 that are output from the packetizing block 14 are sent to a stream transmitting portion 15.

The stream transmitting portion 15 performs a process for transmitting the plurality of real time streams RS1, RS2, and RS3 and the non-real time stream NS1 over one transmission path.

The stream transmitting portion 15 assigns transmission times to the packets of the real time streams RS1, RS2, and RS3 so that the packets can be transmitted at predetermined time intervals. When the transmission times of the packets of the real time streams RS1, RS2, and RS3 overlap, the stream transmitting portion 15 mediates them.

At that point, the transmission order of the packets of the real time streams RS1, RS2, and RS3 is decided so that the jitters of the packets of the real time streams RS1, RS2, and RS3 become minimal. In contrast, the packets of the non-real time stream NS1 are transmitted on best effort basis so that they do not adversely affect the transmissions of the packets of the real time streams RS1, RS2, and RS3 and that the delays of the packets of the non-real time stream NS1 do not become large. The structure of the stream transmitting portion 15 will be described later.

The stream transmitting portion 15 outputs the real time streams RS1, RS2, and RS3 and the non-real time stream NS1 over one transmission path. The streams that are output from the stream transmitting portion 15 are sent to a communication protocol block 16.

The communication protocol block 16 performs a protocol process for the streams in accordance with for example Transmission Control Protocol/Internet Protocol (TCP/IP) that is used in the Internet so that they can be transmitted over the network. The real time streams are transmitted in accordance with the User Data Protocol (UDP). It should be noted that the communication protocol used in the communication protocol block 16 is not limited to the foregoing communication protocol.

Packets processed in accordance with the foregoing protocol by the communication protocol block 16 are sent to a physical layer block 17. The physical layer block 17 transmits the packets that have been processed by the communication protocol block 16 over a network 18. As examples of the physical layer block, a cable interface and a wireless interface can be used. As examples of the wireless interface, the Institute of Electrical and Electronics Engineers (IEEE) 820.11b and IEEE 802.11a are well known. The network 18 is for example the Internet. Of course, a dedicated network that connects information units or an information unit and a video unit may be used.

As described above, according to the embodiment shown in FIG. 3, the stream transmitting portion 15 is disposed. The stream transmitting portion 15 transmits the real time streams RS1, RS2, and RS3 and the non-real time stream NS1 over one transmission path.

In addition, the stream transmitting portion 15 assigns the transmission times to the real time streams so that the packets of the real time streams RS1, RS2, and RS3 can be transmitted at constant intervals. When the transmission times of the packets of the plurality of streams overlap, the transmission order of the packets of the real time streams RS1, RS2, and RS3 is decided so that the jitters thereof become minimal. The packets of the non-real time stream NS1 are transmitted on best effort basis so that the packets of the non-real time stream NS1 do not adversely affect the transmissions of the packets of the real time streams RS1, RS2, and RS3 and that the delay times of the packets of the non-real time stream NS1 become minimal. Next, the stream transmitting portion 15 that performs the forgoing operation will be described in detail.

Figure 4:
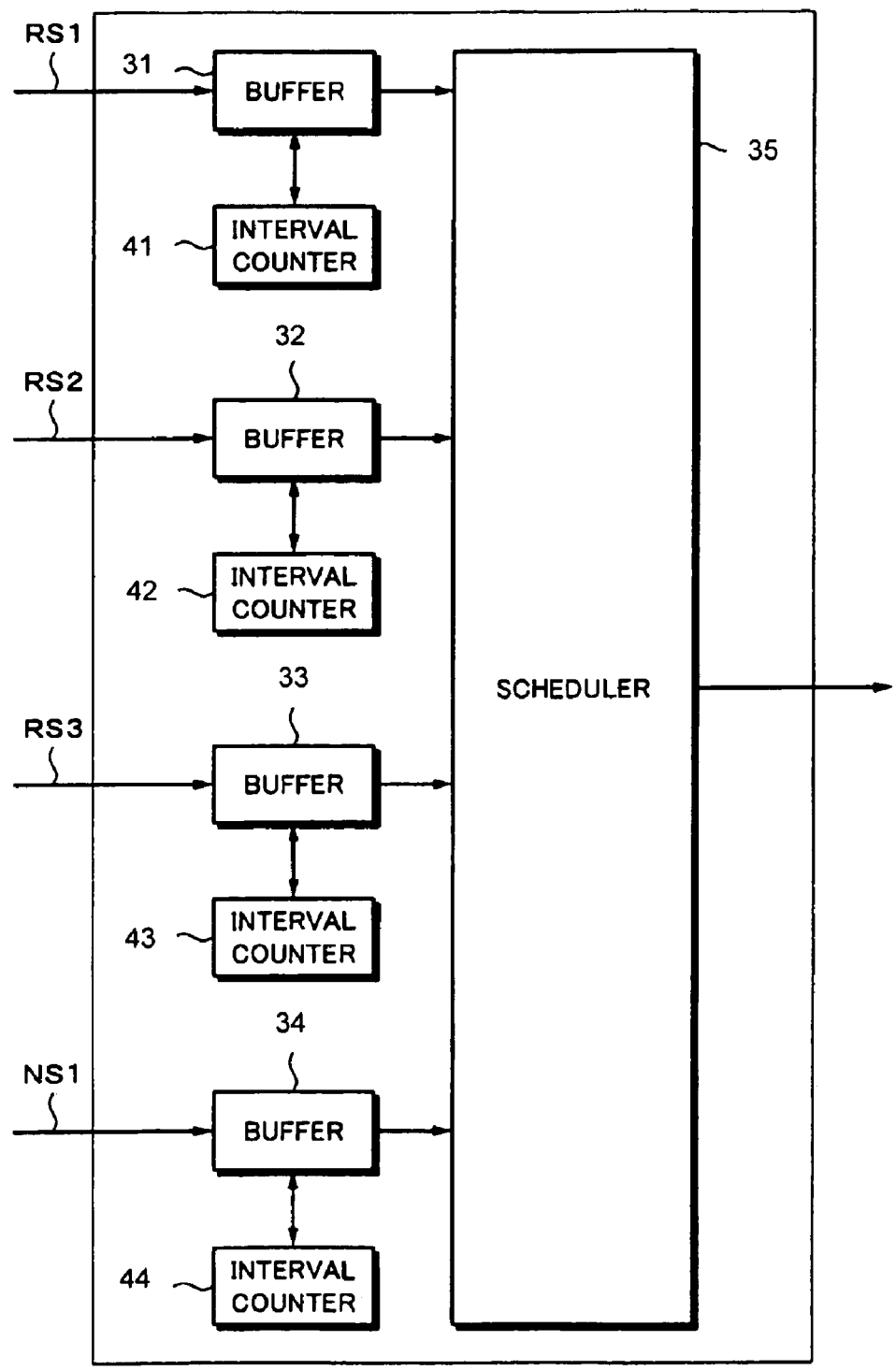
FIG. 4 is a block diagram showing a structure of a stream transmitting portion.

FIG. 4 shows a structure of the stream transmitting portion 15. In FIG. 4, buffer memories 31, 32, and 33 temporarily store the packets of the real time streams RS1, RS2, and RS3 that are output from the packetizing blocks 11, 12, and 13. The buffer memories 31, 32, and 33 are FIFO memories that successively store the packets of the real time streams RS1, RS2, and RS3.

Interval counters 41, 42, and 43 are connected to the buffer memories 31, 32, and 33, respectively. The interval counters 41, 42, and 43 count the time intervals of the packets of the real time streams RS1, RS2, and RS3, respectively.

When the interval counters 41, 42, and 43 have counted predetermined time intervals (hereinafter referred to as scheduling times) of the packets of the real time streams RS1, RS2, and RS3 stored in the buffer memories 31, 32, and 33, the interval counters 41, 42, and 43 send transmission requests to a scheduler 35 so that it gives transmission rights to the buffer memories 31, 32, and 33. The packets of the buffer memories 31, 32, and 33 are read.

The buffer memory 34 temporarily stores the packets of the non-real time stream NS1. The buffer memory 34 is a FIFO memory that successively stores the packets of the non-real time stream NS1. When the buffer memory 34 has stored the packets of the non-real time stream NS1, the buffer memory 34 sends a transmission request to the scheduler 35. When the scheduler 35 has given a transmission right to the buffer memory 34, the packets of the non-real time stream NS1 are read therefrom.

Figure 5:
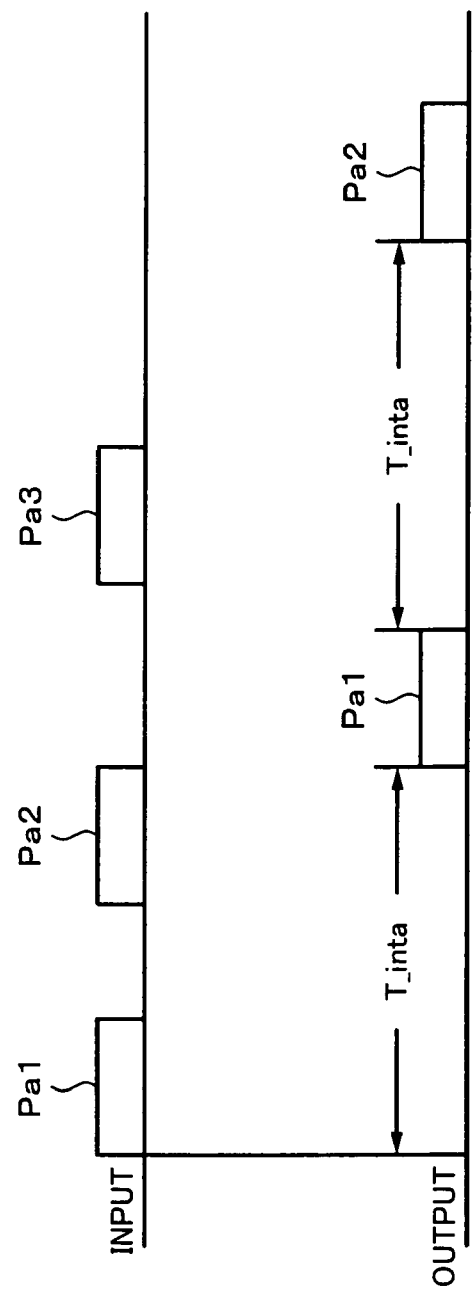
FIGS. 5A and 5B are schematic diagrams describing a transmission of a real time stream.

FIGS. 5A and 5B describe time intervals of packets of a real time stream. As shown in FIG. 5A, it is assumed that packets Pa1, Pa2, Pa3, . . . of the real time stream RS1 that are output from the packetizing block 11 are input to the buffer memory 31. The packets Pa1, Pa2, Pa3, . . . of the real time stream RS1 are successively stored in the buffer memory 31 of the stream transmitting portion 15 and transmitted at the predetermined time intervals T_inta (unless they do not overlap with the transmissions of packets of other streams).

When the packet Pa1 is input to the buffer memory 31, a value corresponding to the time interval T_inta is set to the interval counter 41. When the value corresponding to the time interval T_inta has been set to the interval counter 41, the interval counter 41 starts down-counting. The value of the interval counter 41 decreases as the time elapses. After the time interval T_inta has elapsed, the value of the interval counter 41 becomes "0".

The time at which the value of the interval counter 41 becomes "0" is a scheduling time. When the value of the interval counter 41 becomes "0", the interval counter 41 outputs a transmission request to the scheduler 35. The transmission request causes the scheduler 35 to permit the buffer memory 31 to transmit a packet. As a result, the buffer memory 31 outputs the packet Pal (unless it does not overlap with the transmissions of packets of other streams).

After the packet Pa1 has been output from the buffer memory 31, when the next packet Pa2 is left therein, the value corresponding to the time interval T_inta is newly set to the interval counter 41.

After the time interval T_inta has elapsed, the value of the interval counter 41 becomes "0". When the value of the interval counter 41 becomes "0", the interval counter 41 outputs a transmission request to the scheduler 35. The transmission request causes the scheduler 35 to give a transmission permission to the buffer memory 31. As a result, the buffer memory 31 outputs the packet Pa2 (unless it does not overlap with the transmissions of packets of other streams).

In such a manner, the value corresponding to the time interval T_inta is set to the interval counter 41. When the value of the interval counter 41 becomes "0", the interval counter 41 outputs a transmission request to the scheduler 35. As a result, the transmission intervals of packets are kept constant.

Like the buffer memory 31 that stores the real time stream RS1, values corresponding to predetermined time intervals T_intb and T_intc are set to the interval counters 42 and 43 of the buffer memories 32 and 33, respectively. When the values of the interval counters 42 and 43 become "0", they output transmission requests to the scheduler 35. The transmission requests cause the transmission intervals of the packets of the real time streams RS1 and RS2 that are transmitted from the real time streams RS1 and Rs2 to be kept constant.

Whenever the predetermined time intervals have elapsed, the buffer memories 31, 32, and 33 that store the packets of the real time streams RS1, RS2, and RS3, respectively, send transmission requests to the scheduler 35. When a packet is input to the buffer memory 34 that stores the non-real time stream NS1, the buffer memory 34 sends a transmission request to the scheduler 35. Thus, when the transmission requests for the packets of the real time streams RS1, RS2, and RS3 and the non-real time stream NS1 are output, the transmission times thereof may overlap.

When the transmission times of the packets of the real time streams RS1, RS2, and RS3 overlap, the scheduler 35 decides the transmission order of the packets of the real time streams RS1, RS2, and RS3 so that the jitters of the packets of the real time streams RS1, RS2, and RS3 become minimal. In contrast, the packets of the non-real time stream NS1 are transmitted on best effort basis so that they do not adversely affect the packets of the real time streams RS1, RS2, and RS3 and that the delay times of the packets of the non-real time stream NS1 become minimal.

Figure 6:
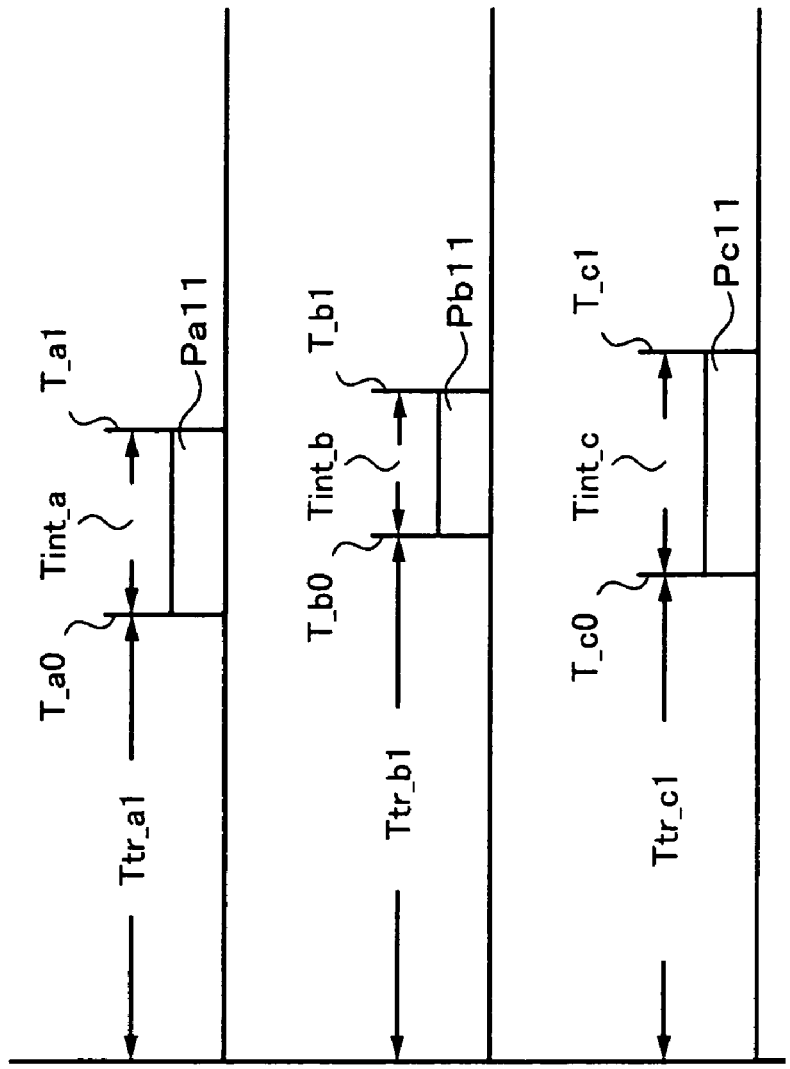
FIGS. 6A, 6B, and 6C are schematic diagrams describing scheduling of real time streams.

First of all, the scheduling process of real time streams will be described. As shown in FIG. 6A to FIG. 6C, it is assumed that the scheduling time of a packet Pa11 of the real time stream RS1 is T_a0 (see FIG. 6A), the scheduling time of a packet Pb11 of the real time stream RS2 is T_b0 (see FIG. 6B), and the scheduling time of a packet Pc11 of the real time stream RS3 is T_c0. In this case, as shown in FIG. 6, since the transmission times of the packet Pa11 of the real time stream RS1, the packet Pb11 of the real time stream RS2, and the packet Pc11 of the real time stream RS3 overlap, they should be mediated.

When the transmission times of the packets Pa11, Pb11, and Pc11 of the real time streams RS1, RS2, and RS3 transmitted from the buffer memories 31, 32, and 33 overlap, the transmission order of the packets of the real time streams RS1, RS2, and RS3 is decided so that the jitters of the packets of the real time streams RS1, RS2, and RS3 become minimal.

In other words, in the case that the packet Pa11 of the real time stream RS1 stored in the buffer memory 31 is transmitted first, in the case that the packet Pb11 of the real time stream RS2 stored in the buffer memory 32 is transmitted first, and in the case that the packet Pc11 of the real time stream RS3 stored in the buffer memory 33 is transmitted first, jitters that adversely affect packets of the other streams are calculated. The transmission order of packets of the streams is decided so that the packets of the streams are least affected by the jitters.

In the case shown in FIG. 6A to FIG. 6C, there are transmission orders of packets Pa11, Pb11, and Pc11; packets Pa11, Pc11, and Pb11; packets Pb11, Pa11, and Pc11; packets Pb11, Pc11, and Pa11; packets Pc11, Pa11, and Pb11; and packets Pc11, Pb11, and Pa11. Among these transmission orders, with respect to the packets Pa11, Pb11, and Pc11, the transmission order thereof is decided so that the jitters become minimal.

In such a manner, the jitters of all transmission orders are compared. Packets are transmitted in the order of which the jitters become minimal. As a result, packets to be transmitted can be scheduled so that the jitters do not adversely affect packets of the other streams.

However, to compare jitters of all combinations of packets to be transmitted and transmit packets in a combination that allows jitters to become minimal, if the number of streams is N, jitters should be calculated N factorial times.

In the example, the transmission end times of the packets of the real time streams RS1, RS2, and RS3 are calculated. Transmission permissions are given in the order of earlier transmission end times of the packets of the real time streams RS1, RS2, and RS3.

The next packet delays by the time period corresponding to the transmission end time of the preceding packet. Thus, the jitter of the next packet is large as the transmission end time of the preceding packet is late. Consequently, when packets are scheduled in the order of earlier transmission end times, the real time streams RS1, RS2, and RS3 are least affected by jitters.

The transmission end time T_a1 of the packet Pa11 of the real time stream RS1 is expressed by the sum of the transmission time Ttr_a1 of the packet Pa11 of the real time stream RS1 and the time interval T_inta of the real time stream RS1. Thus, the transmission end time T_a1 of the packet Pa11 of the real time stream RS1 can be expressed as follows:

$T\_a1 = Ttr\_a1$ (transmission time) $+ Tint\_a1$ (time interval)

Likewise, the transmission end time T_b1 of the packet Pb11 of the real time stream RS2 can be expressed as follows:

$T\_b1 = Ttr\_b1$ (transmission time) $+ Tint\_b1$ (time interval)

The transmission end time T_c1 of the packet Pc11 of the real time stream RS3 can be expressed as follows:

$T\_c1 = Ttr\_c1$ (transmission time) $+ Tint\_c1$ (time interval)

In other words, the transmission end time T_a1 of the packet Pa11 of the real time stream RS1, the transmission end time T_b1 of the packet Pb11 of the real time stream RS2, and the transmission end time T_c1 of the packet Pc11 of the real time stream RS3 are compared and the packets to be transmitted are scheduled in the order of the earlier transmission end times.

In other words, the packet to be transmitted first can be expressed as follows:

$\min(T\_a1, T\_b1, T\_c1)$ where min (x, y, z) represents a function for obtaining the minimum value of x, y, and z.

The transmission times Ttr (Ttr_a1, Ttr_b1, Ttr_c1) of packets can be expressed as follows:

$Ttr(\text{sec}) = \text{PacketSize(bit)} / \text{LineRate(bit/sec)}$ where PacketSize represents the packet size; and LineRate represents the transmission rate of the transmission path over which packets are transmitted. The transmission rate is a transmission speed over the Internet for example 100 Mbps.

The time interval Tint (T_inta, T_intb, T_intc) can be expressed as:

$Tint(\text{sec}) = Ttr(\text{sec}) * \text{LineRate(bit/sec)} / \text{SetRate(bit/sec)}$ where SetRate represents a transmission rate to be pre-set to the buffer memories 31, 32, and 33.

In FIG. 4, transmission permissions are set to the buffer memories 31, 32, and 33 in the order scheduled by the scheduler 35. When the buffer memories 31, 32, and 33 receive the transmission permissions, they obtain transmission rights. When the buffer memories 31, 32, and 33 have obtained the transmission rights, packets can be transmitted from the buffer memories 31, 32, and 33.

Figure 7:
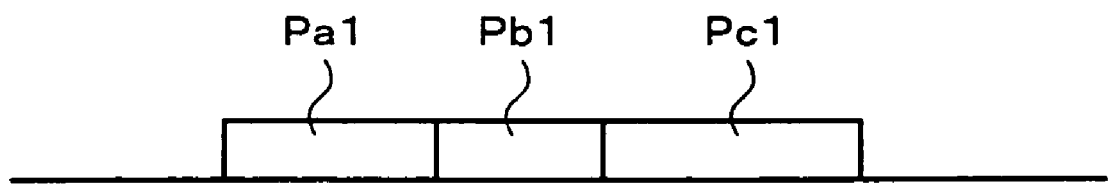
FIG. 7 is a schematic diagram describing scheduling of real time streams.

In the case shown in FIG. 6A to FIG. 6C, the transmission end time T_a1 of the packet Pa11 of the real time stream RS1 is the earliest. The transmission end time T_b1 of the packet Pb11 of the real time stream RS2 is the next earliest. The transmission end time T_c1 of the packet Pc11 of the real time stream RS3 is the latest. Thus, the packets Pa11, Pb11, and Pc11 are scheduled in the order. As a result, as shown in FIG. 7, the packet Pa1 is output first. Next, the packet Pb1 is output. Thereafter, the packet Pc1 is output.

According to the embodiment of the present invention, packets to be transmitted are scheduled in the order of the earlier transmission end times. When packets of all streams to be transmitted are scheduled, jitters in all combinations of packets of streams are compared and packets are transmitted in the order of the smaller jitters. Although the accuracy of the transmission schedule of packets is very high, if the number of streams is N, jitters should be calculated N factorial times. According to the present invention, however, since packets of streams to be transmitted are scheduled on time division manner, when packets of streams to be transmitted are scheduled one time, jitters can be calculated N times.

Next, a process for a non-real time stream will be described. A non-real time stream is transmitted on a best effort basis when it does not adversely affect real time streams and the delay time of the non-real time stream becomes minimal. In reality, the scheduling time of each real time stream and the transmission end time of the non-real time stream are compared. When the transmission end time of the non-real time stream is earlier than the scheduling time of each of the real time streams, a transmission permission is given to the non-real time stream.

Figure 8:
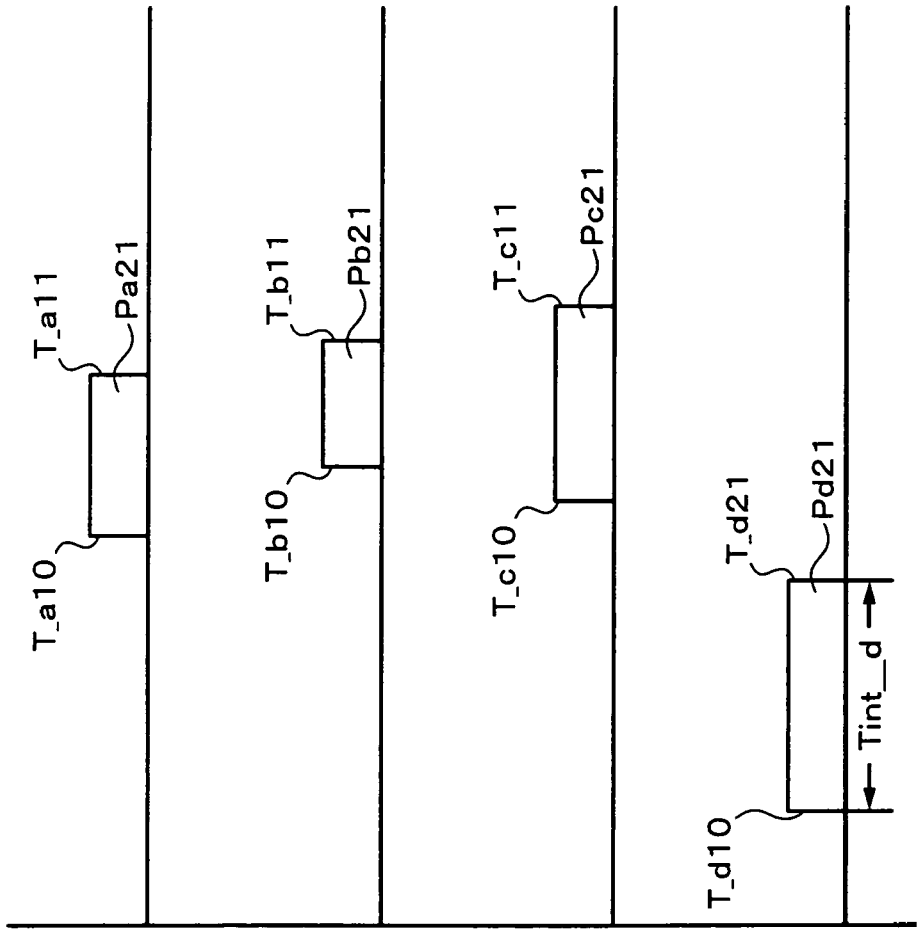
FIGS. 8A, 8B, 8C, and 8D are schematic diagrams describing scheduling of a non-real time stream.

It is assumed that there is a transmission request for the packet Pd21 of the non-real time stream NS1 at a transmission start time T_d10 (see FIG. 8D). In this case, a transmission end time T_d11 of the packet Pd21 of the non-real time stream NS1 is earlier than a scheduling time T_a10 of the packet Pa21 (see FIG. 8A) of the real time stream RS1, a scheduling time T_b10 of the packet Pb21 (see FIG. 8B) of the real time stream RS2, and a scheduling time T_c10 of the packet Pc21 (see FIG. 8C) of the real time stream RS3. In this case, since the packet Pd21 of the non-real time stream NS1 is transmitted first, it does not adversely affect the transmissions of the packets Pa21, Pb21, and Pc21 of the real time streams RS1, RS2, and RS3, the packet Pd21 of the non-real time stream is permitted to be transmitted.

Figure 9:
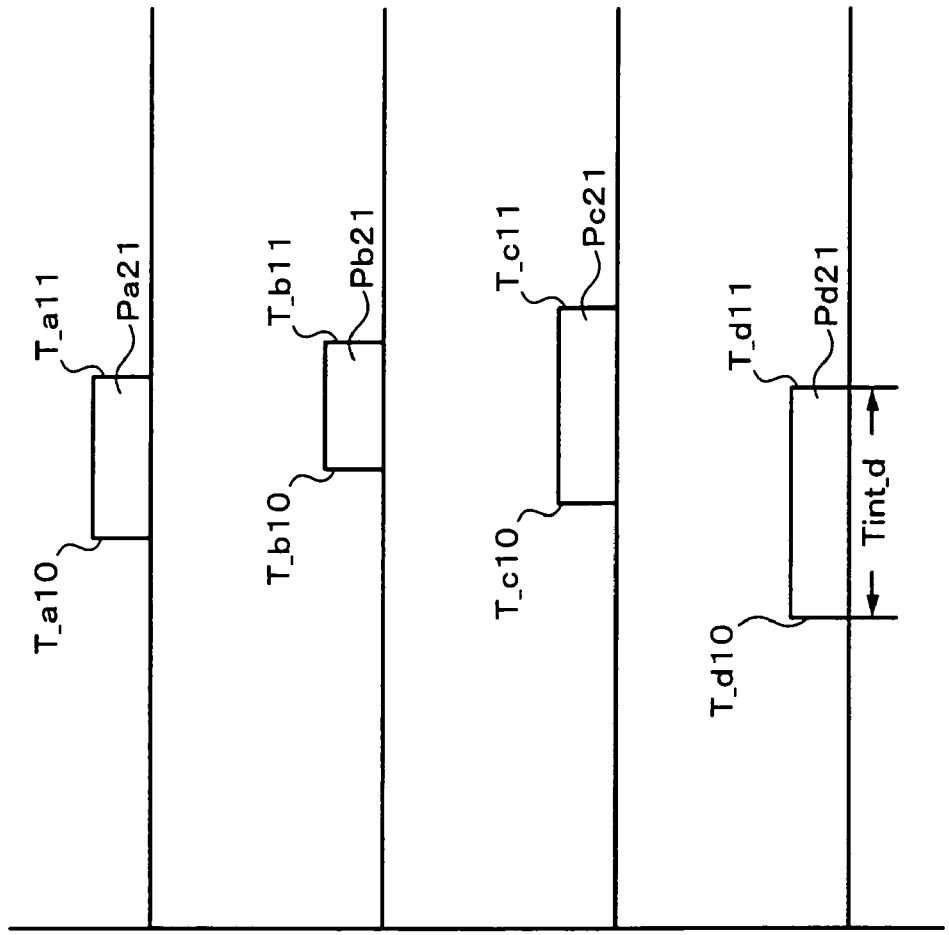
FIGS. 9A, 9B, 9C, and 9D are schematic diagrams describing scheduling of a non-real time stream.

Now, it is assumed that there is a transmission request for the packet Pd21 of the non-real time stream NS1 at the transmission start time T_d10 (see FIG. 9D). In this case, the transmission end time T_d11 of the packet Pd21 of the non-real time stream NS1 is later than the scheduling time T_a10 of the packet Pa21 (see FIG. 9A) of the real time stream RS1, the scheduling time T_b10 of the packet Pb21 (see FIG. 9B) of the real time streams Rs2, and the scheduling time T_c10 of the packet Pc21 (see FIG. 9C) of the real time streams RS3. In this case, since the transmission of the packet Pd21 of the non-real time stream NS1 adversely affects the transmissions of the packets Pa21, Pb21, and Pc21 of the real time streams RS1, RS2, and RS3, the packet Pd21 of the non-real time stream is not permitted to be transmitted and placed in the buffer memory 34 on standby.

When the following relation is satisfied:

$$\min(T\_a10, T\_b10, T\_c10) > Td\_11$$

Packets of the non-real time stream are permitted to be transmitted.

When the transmission intervals of the packets of the real time streams are short, packets of the non-real time stream are not transmitted forever. Thus, when packets of the non-real time stream are not transmitted after a predetermined time has elapsed, it is necessary to implement a mechanism that multiplies Td_11 by a value α that ranges from 0 to 1 so that the packets of the non-real time stream can be transmitted.

That can be expressed as follows:

$$\min(T\_a10, T\_b10, T\_c10) > Td\_11 * \alpha (1 > \alpha >= 0)$$

Figure 10:
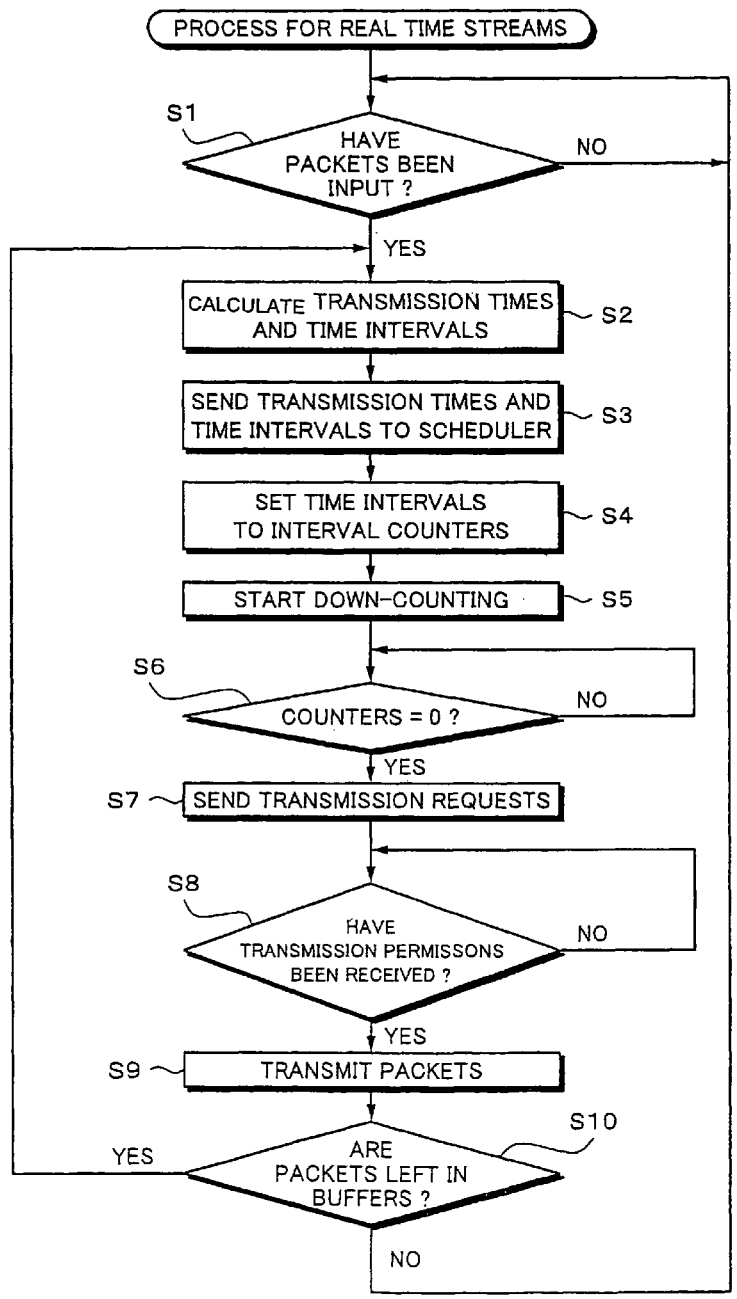
FIG. 10 is a flow chart describing an operation of buffers of real time streams.

FIG. 10 is a flow chart showing a process of each of the buffer memories 31, 32, and 33 that store real time streams. As shown in FIG. 10, when packets are input to the buffer memories (at step S1), transmission times Ttra and time intervals Tint are calculated (at step S2). The transmission times Ttra and the time intervals Tint are sent to the scheduler 35 (at step S3). In addition, the time intervals Tint are set to the interval counters 41, 42, and 43 (at step S4). Thereafter, the interval counters 41, 42, and 43 start down-counting (at step S5). It is determined whether or not the values of the interval counters 41, 42, and 43 are "0" (at step S6). When the values of the interval counters 41, 42, and 43 are "0", they send their transmission requests to the scheduler 35 (at step S7).

The scheduler 35 gives transmission permissions to the buffer memories 31, 32, and 33 in the order of scheduled packets. When the transmission permissions have been given to the buffer memories 31, 32, and 33 (at step S8), packets of the buffer memories 31, 32, and 33 can be transmitted (at step S9).

After packets have been transmitted, it is determined whether or not packets are left in the buffer memories 31, 32, and 33 (at step S10). When packets are left in the buffer memories 31, 32, and 33, the flow returns to step S2. When packets are not left in the buffer memories 31, 32, and 33, the flow returns to step S1.

Figure 11:
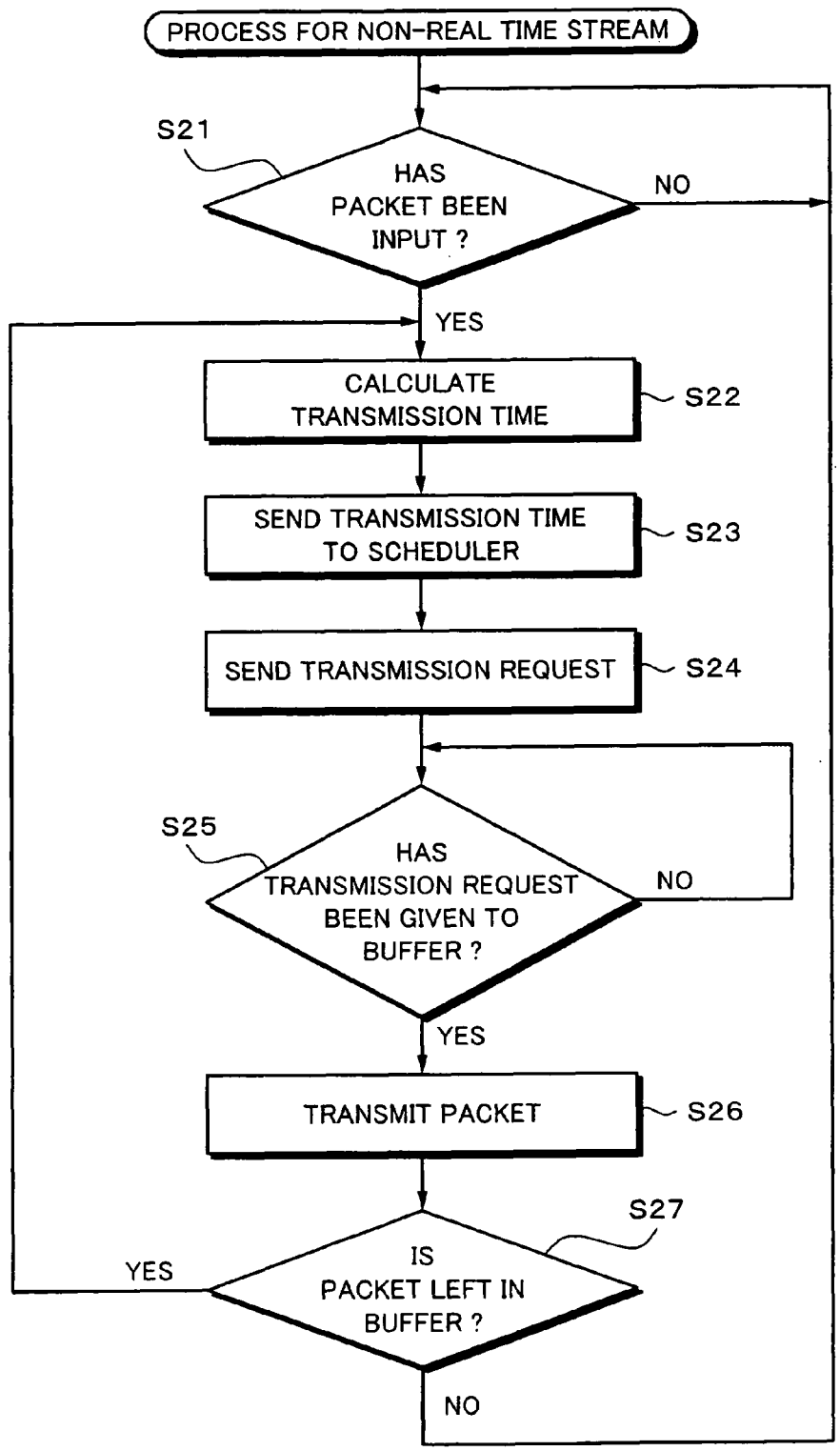
FIG. 11 is a flow chart describing an operation of buffers of a non-real time stream.

FIG. 11 is a flow chart showing a process of the buffer memory 34 that stores a non-real time stream. When a packet of the non-real time stream is input to the buffer memory 34 (at step S21), a transmission time Ttra is calculated (at step S22). The transmission time Ttra is sent to the scheduler 35 (at step S23). In addition, the buffer memory 34 sends a transmission request to the scheduler 35 (at step S24). When the non-real time stream can be transmitted, the scheduler 35 gives a transmission permission to the scheduler 35.

When the buffer memory 34 receives the transmission permission (at step S25), a packet stored in the buffer memory 34 can be transmitted (at step S26).

When a packet has been transmitted from the buffer memory 34, it is determined whether or not another packet is still left in the buffer memory 34 (at step S27). When another packet is still left in the buffer memory 34, the flow returns to step S22. When another packet is not left in the buffer memory 34, the flow returns to step S21.

Figure 12:
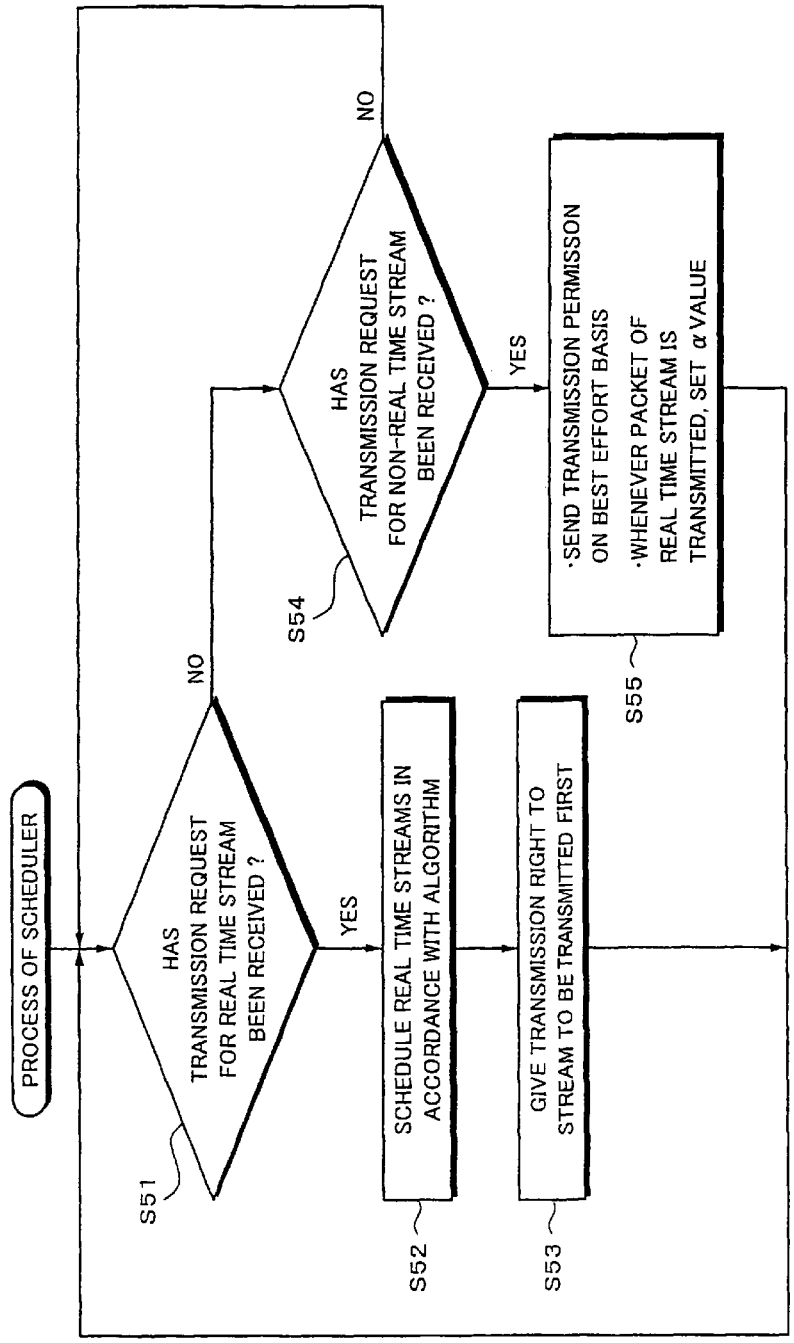
FIG. 12 is a flow chart describing an operation of a scheduler.

FIG. 12 is a flow chart showing a process of the scheduler 35. When the scheduler 35 receives transmission requests from the buffer memories 31, 32, and 33 (at step S51), the scheduler 35 performs a scheduling process for real time streams in accordance with the foregoing algorithm (at step S52). In other words, the scheduler 35 compares the transmission end time of a packet of the real time stream RS1, the transmission end time of a packet of the real time stream RS2, and the transmission end time of a packet of the real time stream RS3 and gives a transmission right to a stream to be transmitted first (at step S53).

When the scheduler 35 has received a transmission request for the non-real time stream NS1 from the buffer memory 34 (at step S54), as described above, the scheduler 35 gives a transmission permission to the scheduler 35 on best effort basis when the packet of the non-real time stream NS1 does not adversely affect packets of real time streams and that the delay time of the packet of the non-real time stream NS1 becomes minimal. In other words, the scheduler 35 compares the transmission end time of a packet of the non-real time stream and scheduling times of packets of a plurality of real time streams. When the transmission end time of a packet of the non-real time stream is shorter than any one of the scheduling times of packets of the plurality of real time streams, a packet of the non-real time stream is transmitted. While a packet of the non-real time stream is placed in the buffer memory 34 on standby, if a transmission permission of a real time stream is given, the α value is decreased to for example ½ (at step S55).

Thus, according to the embodiment of the present invention, when the transmission times of packets of the plurality of real time streams overlap, the transmission order of packets of the real time streams is decided so that jitters of the real time streams become minimal. In reality, packets of the real time streams are scheduled in the order of the earlier transmission end times. Thus, when a plurality of real time streams are transmitted over one transmission path, jitters of packets of the real time streams can be decreased. In addition, the non-real time stream can be transmitted on best effort basis without adversely affecting the transmissions of the real time streams.

Figure 1:
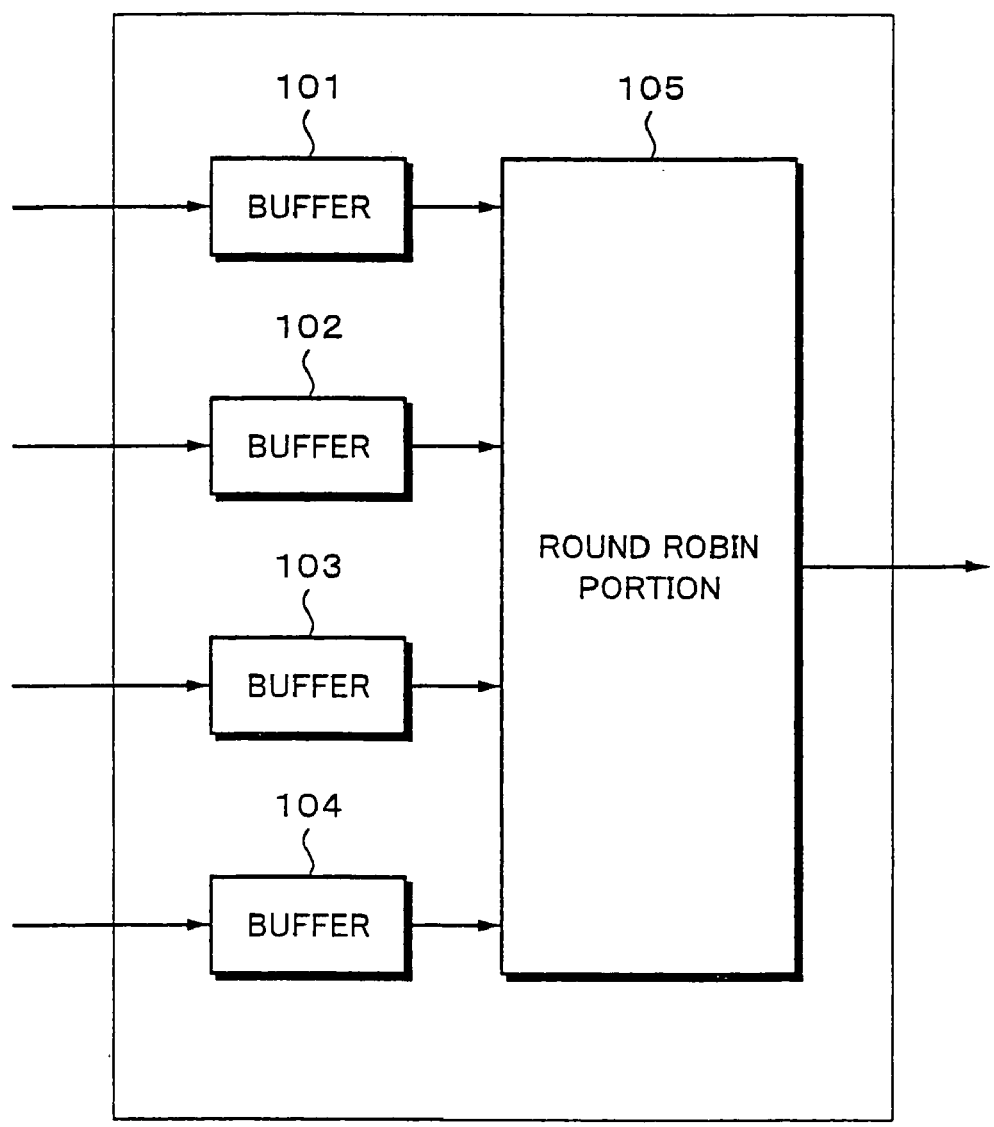
FIG. 1 is a block diagram showing a structure of a conventional stream transmitting portion.
Figure 2:
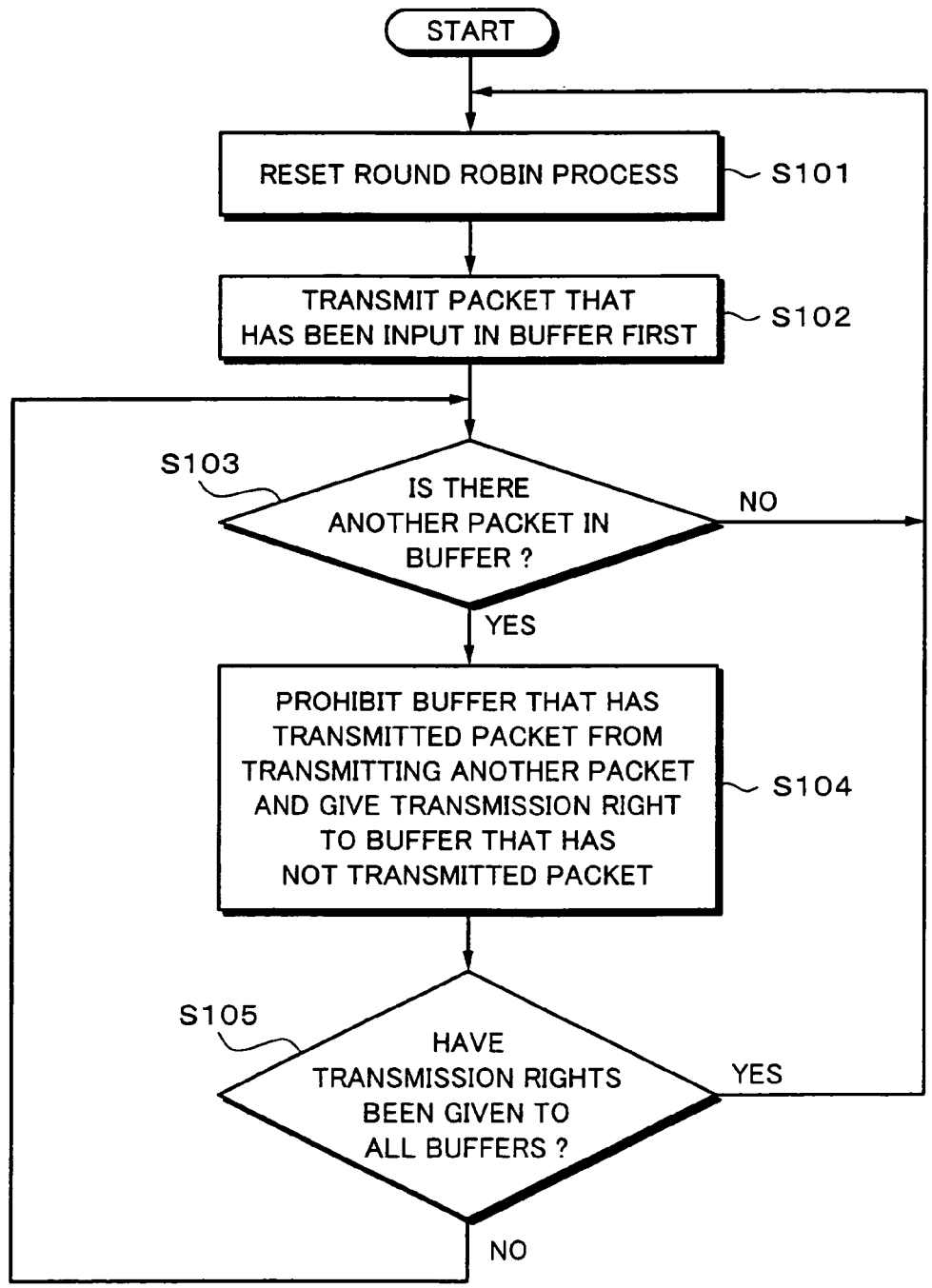
FIG. 2 is a flow chart describing a round robin process.

FIG. 13 shows another embodiment (second embodiment) of the present invention. According to the embodiment shown in FIG. 1, the stream transmitting portion 15 transmits a plurality of streams over one transmission path. Thereafter, the communication protocol block 16 processes the streams in accordance with the predetermined protocol so that they can be transmitted over the network. The processed streams are transmitted over the network 18 through the physical layer block 17.

In contrast, according to the second embodiment of the present invention, real time streams are processed in accordance with a predetermined protocol so that they can be transmitted over a network. Thereafter, a stream transmitting portion transmits the processed streams over a network 62 through a physical layer block 61.

In FIG. 13, data RD11 is supplied to a packetizing block 51. Data RD12 is supplied to a packetizing block 52. Data RD13 is supplied to a packetizing block 53. The packetizing blocks 51, 52, and 53 are packetizing blocks that process real time streams.

The packetizing blocks 51, 52, and 53 packetize the data RD11, RD12, and RD13 so that they can be transmitted over the network.

The packetizing block 51 outputs a packet of a real time stream RS11 of which the data RD11 has been packetized. The packetizing block 52 outputs a packet of a real time stream RS12 of which the data RD12 has been packetized. The packetizing block 52 outputs a packet of a real time stream RS13 of which the data RD13 has been packetized.

Data ND11 is supplied to a packetizing block 54. The packetizing block 54 is a packetizing block that packetizes a non-real time stream. The packetizing block 54 packetizes the data ND11 so that it can be transmitted over the network. The packetizing block 54 outputs a packet of the non-real time stream NS11 of which the data ND11 has been packetized.

Packets of the real time streams RS11, RS12, and RS13 that are output from the packetizing blocks 51, 52, and 53 are supplied to communication protocol blocks 55, 56, and 57, respectively. A packet of the non-real time stream NS11 that is output from the packetizing block 54 is supplied to a communication protocol block 58.

The communication protocol blocks 55, 56, and 57 perform processes for the real time streams RS11, RS12, and RS13 in accordance with a predetermined protocol so that they can be transmitted over the network. The communication protocol block 58 performs a process for the non-real time stream S11 in accordance with a predetermined protocol so that the non-real time stream NS11 can be transmitted over the network.

Packets of the real time streams that have been processed in accordance with the predetermined protocol by the communication protocol blocks 55, 56, and 57 and a packet of the non-real time stream that has been processed in accordance with the predetermined protocol by the communication protocol block 58 are supplied to a stream transmitting portion 60.

The stream transmitting portion 60 performs a process for transmitting the plurality of real time streams RS11, RS12, and RS13 and the non-real time stream NS11 over one transmitting path.

The stream transmitting portion 60 assigns transmission times of packets so that the packets of the real time streams RS11, RS12, and RS13 can be transmitted at predetermined time intervals. When the packets of the real time streams RS11, RS12, and RS13 overlap, they are mediated, the stream transmitting portion 60 mediates them.

The transmission order of the packets of the real time streams RS11, RS12, and RS13 is decided so that the jitters of the packets of the real time streams become minimal. In contrast, the packets of the non-real time stream are transmitted so that they do not adversely affect the transmissions of packets of the real time streams and the delays of the packets of the non-real time stream do not become large.

As the stream transmitting portion 60, the structure as shown in FIG. 4 can be used.

The stream transmitting portion 60 outputs packets of the real time streams RS11, RS12, and RS13 and packets of the non-real time stream NS11 over one transmission path. The streams that are output from the stream transmitting portion 60 are sent to the physical layer block 61. The physical layer block 61 transmits the packets over the network 62.

As described above, in the transmitting apparatus according to the present invention, when a plurality of real time streams and a non-real time stream are transmitted over one transmission path, if the transmission times of the packets of the plurality of streams overlap, the transmission order of the packets of the real time streams RS1, RS2, and RS3 is decided so that the jitters of the packets of the real time streams RS1, RS2, and RS3 become minimal. The packets of the non-real time stream NS11 are transmitted so that they do not adversely affect the transmissions of the packets of the real time streams RS1, RS2, and RS3 and the delay times of the packets of the non-real time stream become minimal. Thus, the jitters of the packets of the real time streams can be decreased. In addition, the non-real time stream can be transmitted on best effort basis without adversely affecting the transmissions of the real time streams.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

According to the present invention, when a plurality of real time streams and a non-real time stream are transmitted over one transmission path, the real time streams are transmitted at predetermined time intervals and the non-real time stream is transmitted so that they do not adversely affect the transmissions of the real time streams. When the transmission times of packets of a plurality of streams overlap, the transmission order of the real time streams are decided so that the jitters of packets of the real time streams become minimal. The non-real time stream is transmitted so that it does not adversely affect the transmissions of the real time streams and the delay times of packets of the non-real time stream become minimal.

In other words, with the time intervals and transmission times of packets of real time streams, the transmission end times thereof are calculated. The transmission order of packets of the real time streams is decided in the order of the earlier transmission end times thereof.

The transmission end times of packets of the non-real time stream are compared with the scheduling times of packets of the plurality of real time streams. When the transmission end times of packets of the non-real time stream are earlier than any one of the scheduling times of packets of the plurality of real time streams, the packets of the non-real time stream are transmitted.

Thus, the jitters of packets of the real time streams can be decreased. In addition, the non-real time stream can be transmitted on best effort basis without adversely affecting the transmissions of the real time streams.

Since the number of calculations necessary for deciding packets to be transmitted first is small, the system can be easily accomplished by any one of hardware and software. In addition, it is not necessary to calculate the transmission order of streams at a time. Instead, whenever one packet has been transmitted, a packet to be transmitted next can be calculated. Thus, since the number of calculations to be performed at a time is small, the restriction of the system that is implemented is small.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data transmitting apparatus comprising:
   a packetizing blocks configured to packetize information and data into a stream of non-real time packets and streams of real time packets, successive ones of the real time packets in one of the streams of real time packets being chronologically separable by a time interval;
   a stream transmitting portion configured to transmit a non-real time packet from the stream of non-real time packets, said non-real time packet being transmissible during a non-real time period,
   wherein said stream transmitting portion is configured to transmit a real time packet from said one of the streams of real time packets and a different real time packet from a different one of the streams of real time packets,
   wherein said real time packet is transmissible before transmission of said different real time packet when an end time for said real time packet is earlier than a different end time for said different real time packet,
   wherein said non-real time period is said time interval when said time interval is determined to be longer than a transmission time for the non-real time packet, said transmission time for the non-real time packet being a time length for transmission of said non-real time packet.

2. The data transmitting apparatus as set forth in claim 1, wherein said non-real time period is a period following an absence of a real time packet request, said real time packet request being a request to transmit any of the real time packets.

3. The data transmitting apparatus as set forth in claim 1, wherein said non-real time packet is transmissible following a non-real time packet request, said non-real time packet request being a request to transmit said non-real time packet.

4. The data transmitting apparatus as set forth in claim 1, wherein said stream transmitting portion is configured to transmit said successive ones of the real time packets.

5. The data transmitting apparatus as set forth in claim 1, wherein said real time packet is transmissible during a real time period and said different real time packet is transmissible during a different real time period, said real time period overlapping said different real time period.

6. The data transmitting apparatus as set forth in claim 5, wherein said real time period terminates at said end time, said different real time period terminating at said different end time.

7. The data transmitting apparatus as set forth in claim 1, wherein said non-real time packets are packets of the information and said real time packets are packets of the data.

8. The data transmitting apparatus as set forth in claim 7, wherein said information is text, said data being moving picture and audio data.

9. A data transmitting method comprising:
   packetizing information and data into a stream of non-real time packets and streams of real time packets, said stream of non-real time packets and said streams of real time packets being stored in buffer memories;
   chronologically separating successive ones of the real time packets in one of the streams of real time packets, a time interval being between said successive ones of the real time packets;
   transmitting a non-real time packet from the stream of non-real time packets, said non-real time packet being transmitted over a transmission path during a non-real time period;
   transmitting a real time packet from said one of the streams of real time packets and a different real time packet from a different one of the streams of real time packets,
   wherein said real time packet is transmitted before transmission of said different real time packet when an end time for said real time packet is earlier than a different end time for said different real time packet,
   wherein said non-real time period is said time interval when said time interval is longer than a transmission time for the non-real time packet, said transmission time for the non-real time packet being the length of time to transmit said non-real time packet.

10. The data transmitting method as set forth in claim 9, wherein said non-real time period is a period following an absence of a real time packet request, said real time packet request being a request to transmit any of the real time packets.

11. The data transmitting method as set forth in claim 9, wherein said non-real time packet is transmitted following a non-real time packet request, said non-real time packet request being a request to transmit said non-real time packet.

12. The data transmitting method as set forth in claim 9, wherein said successive ones of the real time packets are transmitted.

13. The data transmitting method as set forth in claim 9, wherein said real time packet is transmitted during a real time period and said different real time packet is transmitted during a different real time period, said real time period overlapping said different real time period.

14. The data transmitting method as set forth in claim 13, further comprising:
    terminating said real time period at said end time; and
    terminating said different real time period at said different end time.

15. The data transmitting method as set forth in claim 9, wherein said non-real time packets are packets of the information and said real time packets are packets of the data.

16. The data transmitting method as set forth in claim 15, wherein said information is text, said data being moving picture and audio data.

* * * * *